(12) United States Patent
Kawano et al.

(10) Patent No.: US 6,170,589 B1
(45) Date of Patent: Jan. 9, 2001

(54) SNOWMOBILE

(75) Inventors: Shizuo Kawano; Tadaaki Nagata; Akihiro Komatsu, all of Saitama (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 08/799,217

(22) Filed: Feb. 14, 1997

(30) Foreign Application Priority Data

Feb. 16, 1996 (JP) .................................................. 8-053756
Feb. 16, 1996 (JP) .................................................. 8-053757

(51) Int. Cl.$^7$ .................................................. B62M 27/02
(52) U.S. Cl. ........................ 180/190; 414/490; 180/89.17
(58) Field of Search .................................... 180/182, 186, 180/190, 900, 89.17, 89.18, 183, 184, 185, 187, 188, 189; 414/458, 457, 490

(56) References Cited

U.S. PATENT DOCUMENTS

| | | |
|---|---|---|
| 3,568,787 | 3/1971 | Gremeret . |
| 3,572,813 * | 3/1971 | Takada .................................... 296/28 |
| 3,658,200 * | 4/1972 | Chaplinski ............................ 414/447 |
| 3,667,728 * | 6/1972 | Garelick ................................ 414/458 |
| 4,307,788 | 12/1981 | Shelton . |
| 5,279,381 * | 1/1994 | Fukuda ................................. 180/190 |
| 5,474,146 * | 12/1995 | Yoshioka et al. ..................... 180/184 |
| 5,586,614 * | 12/1996 | Kouchi et al. ........................ 180/190 |
| 5,829,545 * | 11/1998 | Yamamoto et al. .................. 180/190 |

FOREIGN PATENT DOCUMENTS 4-5188    1/1992  (JP) .
4-331659  11/1992 (JP) .

* cited by examiner

*Primary Examiner*—Paul N. Dickson
*Assistant Examiner*—Avraham H. Lerner
(74) *Attorney, Agent, or Firm*—Birch, Stewart, Kolasch & Birch, LLP (57) ABSTRACT

A snowmobile including side grips attached to the right and the left side surfaces of a body of a snowmobile at a position corresponding to a position at a distance towards the front of the snowmobile from the center of gravity of the body. The side grips project from the right and the left side surfaces to define a maximum width (Wmax) of the body. A rear grip is attached to the rear end of a floor member at a distance toward the rear of the snowmobile from the center of gravity. When the snowmobile is inclined, the side grips first come into contact with packed snow (the ground) and serve as a bumper so that a body cover of the snowmobile is not damaged. When carrying the snowmobile, the snowmobile is supported at the right and the left side grip and the rear grip on a snowmobile carrier. A front portion of the body includes an engine compartment in front of the floor which is covered with a body cover. A maintenance opening which is covered with a lid is formed in the back wall of the body cover. When the lid is removed, a battery and an oil tank installed in the engine compartment are accessible for maintenance work regardless of the position of the steering bar.

17 Claims, 8 Drawing Sheets

SNOWMOBILE

BACKGROUND OF THE INVENTION

1. Field of the Invention

The present invention relates to a snowmobile including a body, a steering ski suspended from a front portion of the body, and an engine-driven caterpillar unit suspended from a rear portion of the body and to a body structure for a stand-up snowmobile.

2. Description of the Related Art

Snowmobiles of this type have been known, for example, from Japanese Patent Laid-open No. Hei 4-331659, in which the driver rides the snowmobile on a floor in a standing position and controls the body of the snowmobile by posture movement.

A snowmobile disclosed in Japanese Patent Laid-open No. Hei 4-5188 is provided with a rear grip at the rear end of a floor. A snowmobile disclosed in U.S. Pat. No. 3,568,787 is provided with stabilizing arms protruding outwardly from the opposite sides of a caterpillar unit with an intention to give antiroll stability to the snowmobile. A stand-up snowmobile is disclosed in U.S. Pat. No. 4,307,788.

Each of the vehicles described in the above documents requires many men for carrying, even in the case wherein the snowmobile includes a rear grip as in the vehicle disclosed in Japanese Patent Laid-open No. Hei 4-5188.

Although it is important to protect the body of a snowmobile from damage when the snowmobile is laid on one side thereof, known snowmobiles do not provide any means for protecting the body. The stabilizing arms of the snowmobile disclosed in U.S. Pat. No. 3,568,787 are not effective in protecting the body from damage.

Each of snowmobiles disclosed in Japanese Patent Laid-open Nos. 4-163359 and 4-51188 includes a steering ski suspended from a front portion of a body, a power-driven caterpillar unit suspended from a rear portion of the body, and a steering bar attached to a steering post supported for back-and-forth swinging motion on an upper portion of the steering shaft of the steering ski. The steering bar is operated by the rider standing on a floor extending over the caterpillar unit, and a body cover covers the body including an engine compartment formed in front of the floor so as to divide the engine compartment and a standing space for the rider on the floor.

A power system including an engine and accessories is installed in the engine compartment. When the power system installed in the engine compartment needs maintenance, the body cover must be removed. When removing the body cover, the handle post capable of back-and-forth swinging motion needs to be held in a position so that the body cover can be removed. This requires troublesome work.

The body cover which needs to be removed is subject to many restrictions on shape, position and such. A small degree of freedom in design is available for the body cover.

SUMMARY AND OBJECTS OF THE INVENTION

Accordingly, it is an object of the present invention to provide a structure for a snowmobile, which facilitates the work of carrying the snowmobile and effectively protects the body of the snowmobile from damage.

According to the present invention, a snowmobile includes a body, a steering ski suspended from a front portion of the body, and an engine-driven caterpillar unit suspended from a rear portion of the body. The body is provided with side bumpers protruding out from the right and the left side surface of the body and defining a maximum width of the body. In addition, the body includes a rear grip at a rear end.

According to the present invention, the center of gravity of the snowmobile is located between the side bumpers and the rear grip.

The present invention provides a snowmobile comprising a body, a steering ski including a steering shaft suspended from a front portion of the body, a power-driven caterpillar unit suspended from a rear portion of the body and a steering bar attached to a steering post supported for back-and-forth swinging motion on an upper portion of the steering shaft of the steering ski. The steering bar is operated by the rider standing on a floor extended over the caterpillar unit. A body cover covers a body including an engine compartment formed in front of the floor so as to divide the engine compartment and a standing space for the rider on the floor. The body cover is provided with a lid for covering an opening formed in its back surface so as to permit the engine compartment and the standing space to communicate with each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
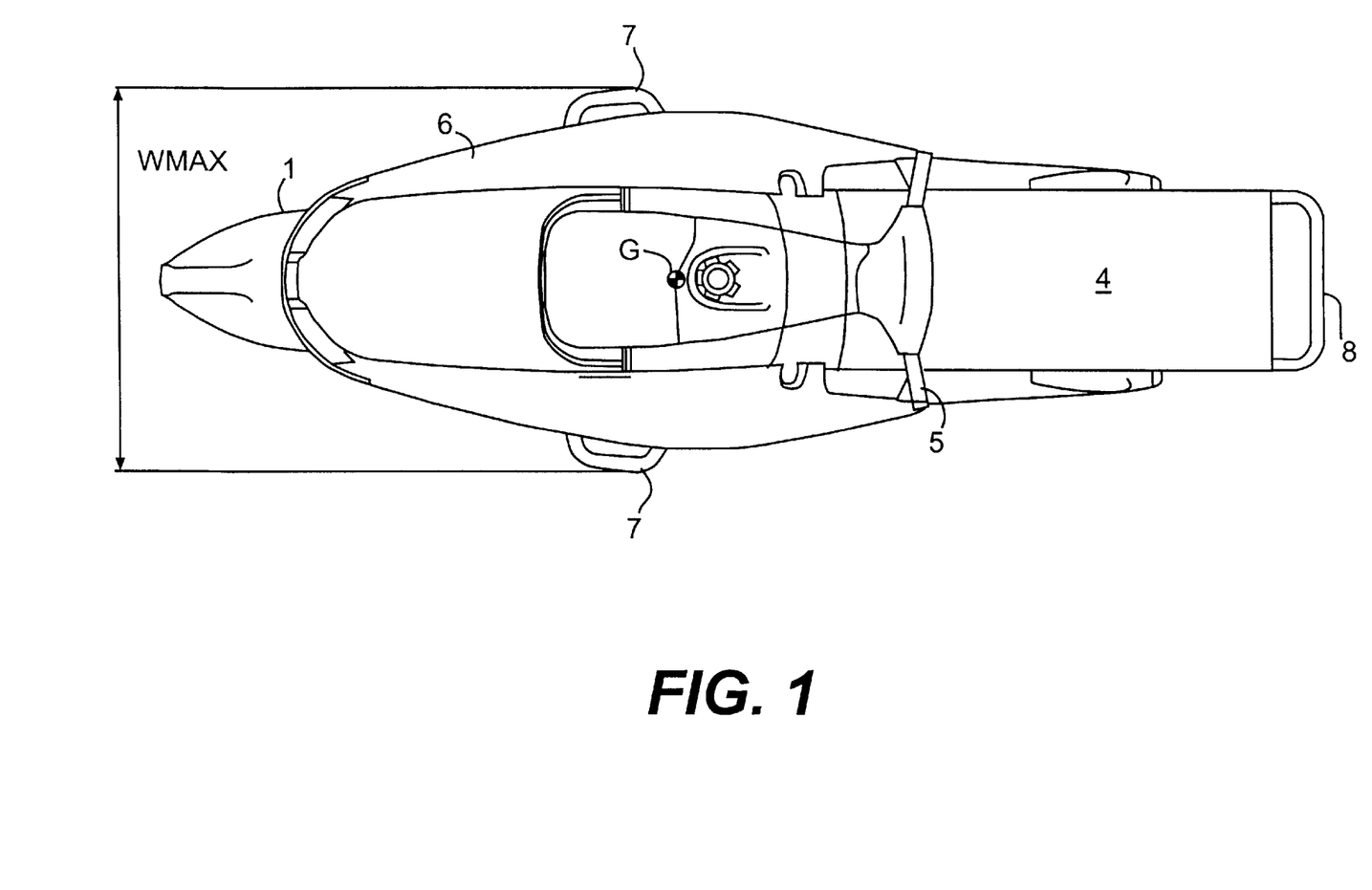
FIG. 1 is a side view of a snowmobile.
Figure 2:
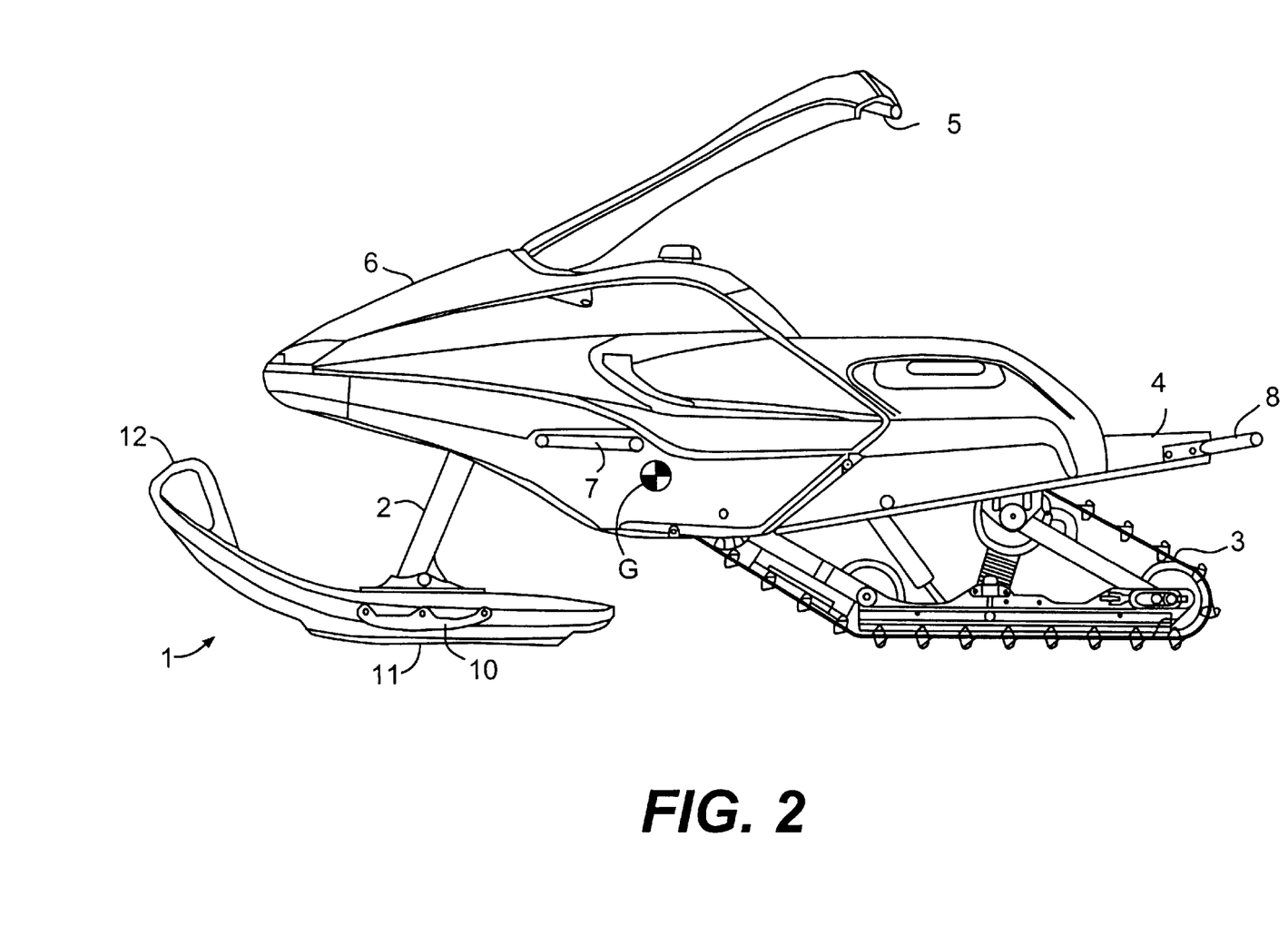
FIG. 2 is a plan view of a snowmobile.

FIGS. 1 and 2 illustrate a plan view and a side view of a snowmobile, respectively. Referring to FIG. 2, a steering ski 1 is suspended by a telescopic front suspension 2 on a front portion of a body, and an engine-driven caterpillar unit 3 is suspended from a rear portion of the body for up-and-down movement.

A floor 4 extends over the caterpillar unit 3. A driver standing on the floor 4, operates a steering bar 5, and changes his or her posture for controlling the body of the snowmobile.

The steering bar 5 can be moved back and forth, and can be turned right and left to turn the front suspension 2 about an axis so that the steering ski 2 is turned for steering.

As shown in FIG. 1, a front portion of the body is covered with a body cover 6, and side grips 7 are attached to the right and the left side surfaces of the body cover 6 so as to protrude outwardly in a lateral direction. The side grips 7 define a maximum width Wmax of the body.

Each side grip 7 is formed in a U-shape as viewed in a plan view and includes opposite ends fixed to a main frame (not shown) which is covered with the body cover 6.

A rear grip 8 is attached to the rear end of the floor 4. The body has a center of gravity G (FIG. 1) at a position in a vertical plane which includes the longitudinal axis of the body and a short distance from a line interconnecting the side grips 7 toward the rear grip 8.

The center of gravity G of the body may be at any position between the line interconnecting the side grips 7 and the rear grip 8. However, it is particularly advantageous when the position of the center of gravity G is near the line interconnecting the side grips 7 as shown in FIG. 1, which will be described later. When the body is in an inclined position as shown in FIG. 3, the side grip 7 comes into contact with the ground (packed snow) first.

Figure 3:
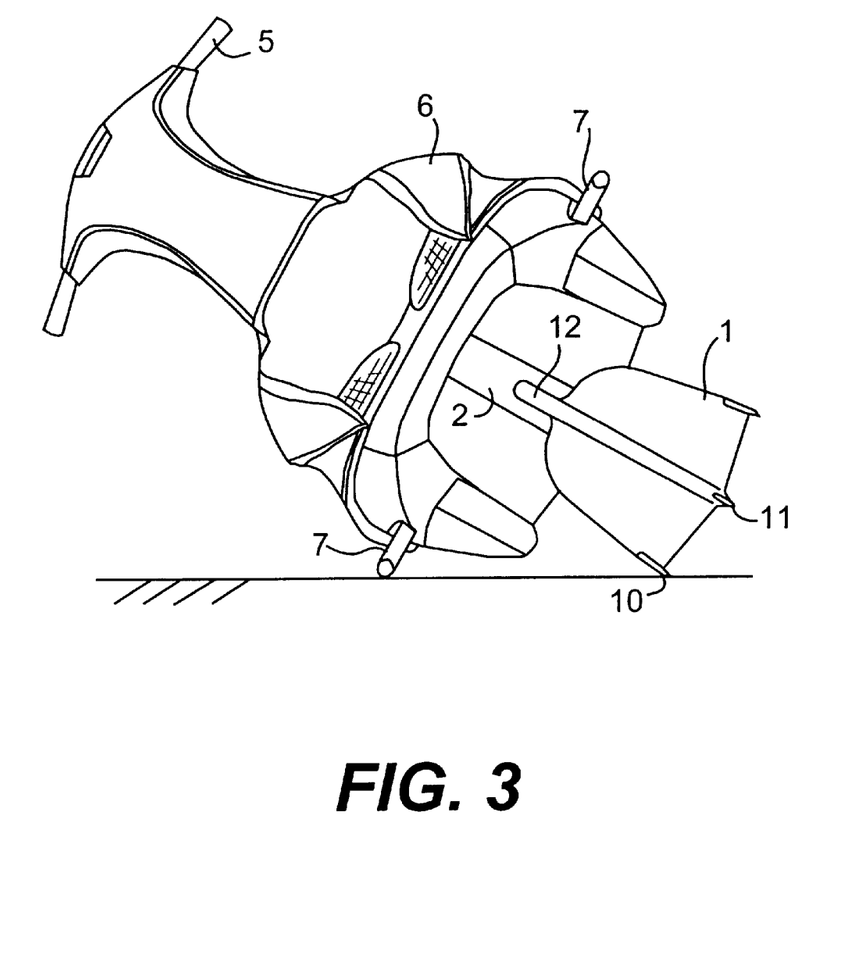
FIG. 3 is a front view of a snowmobile in an inclined position.

As also illustrated in FIG. 3, side edges 10, a center edge 11, and a loop-shaped front grip 12 are formed integrally with the front end portion of the steering ski 1.

Figure 4:
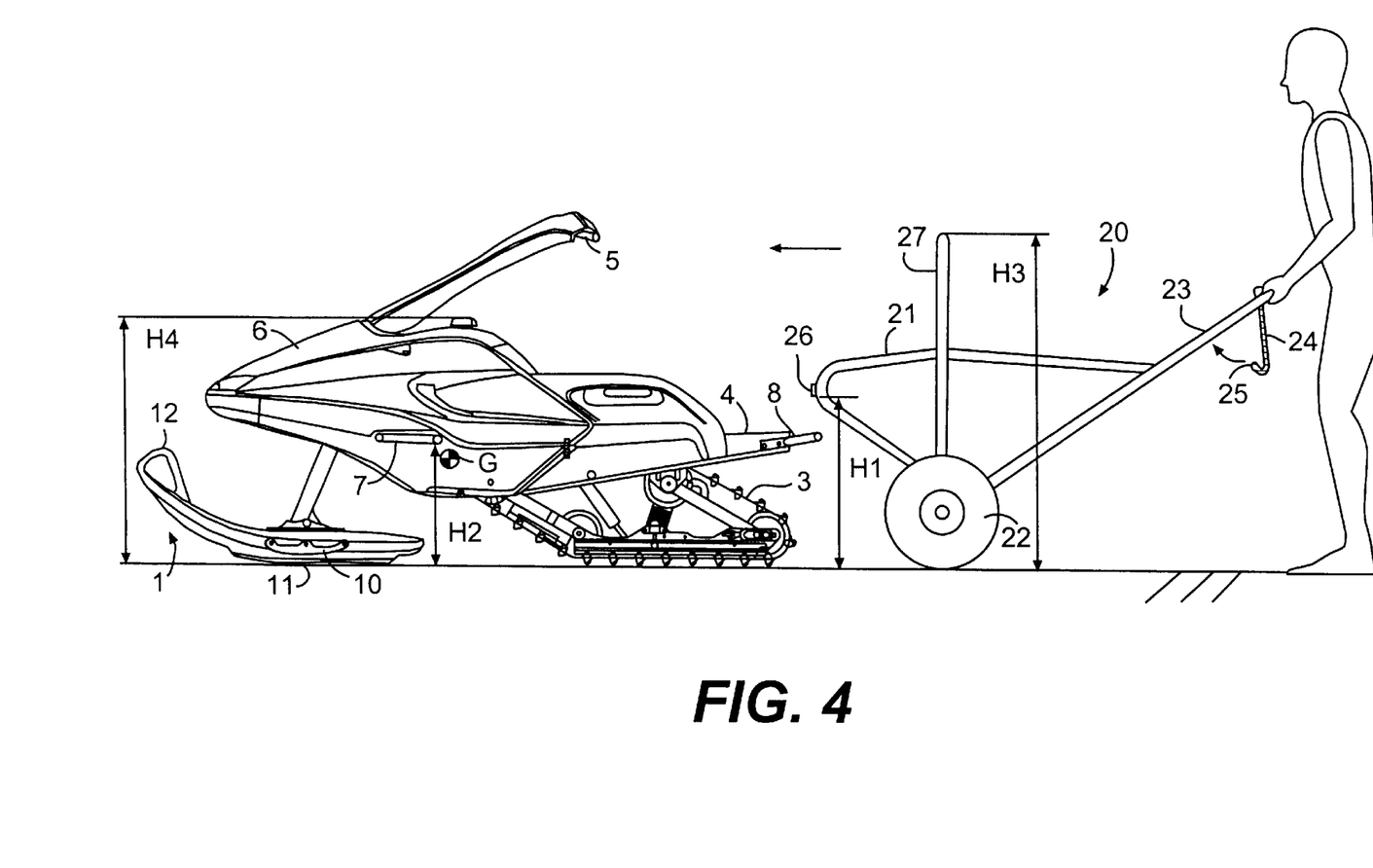
FIG. 4 is a side view showing a snowmobile in a position prior to commencing a carrying operation.
Figure 5:
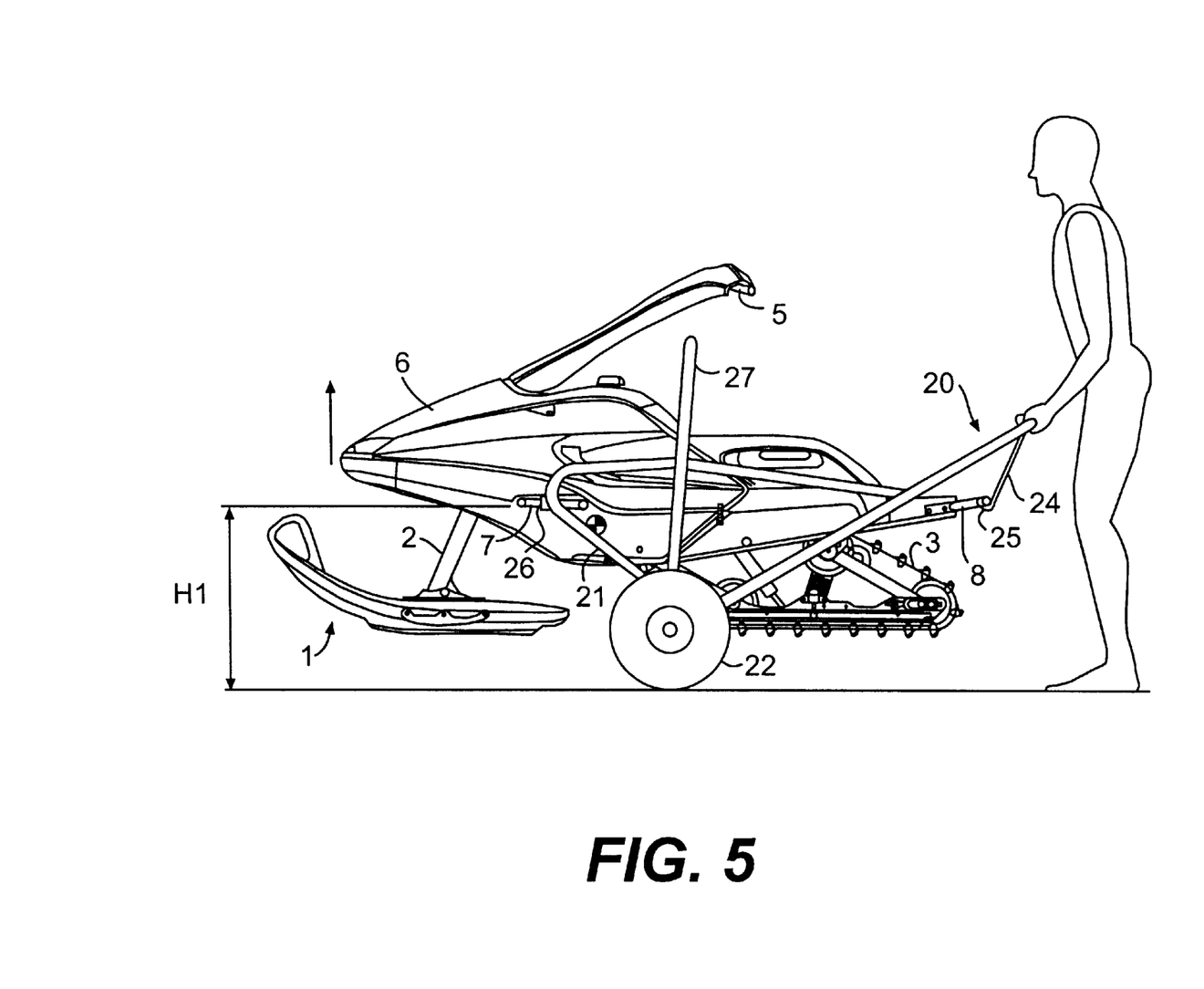
FIG. 5 is a side view of a snowmobile in a position during a carrying operation.

FIG. 4 illustrates the snowmobile and a snowmobile carrier 20 ready to be loaded with the snowmobile. FIG. 5 illustrates the snowmobile loaded onto the snowmobile carrier 20 for transportation.

The snowmobile carrier 20 includes a pair of side frames 21 in the shape of an inverted triangle as viewed laterally, a wheel 22 supported on the lower ends, i.e., the lower vertices, of the triangular side frames 21, and a pair of handles 23 formed by extending the lower rear sections of the side frames 21 towards the rear. The pair of side frames 21 are spaced a distance approximately equal to the maximum width Wmax of the body apart.

The right and the left handles 23 are connected by a cross member joined to the rear ends of the right and the left handles 23. A suspending member 24 is swingably suspended from the cross member. A hook 25 formed by bending an end portion of the suspending member 24 in a U-shape is brought into engagement with the rear grip 8.

Substantially L-shaped support members 26 project inwardly from the front ends of the right and the left side frame 21. The distance between the inner ends of the right and the left support member 26 is smaller than the maximum width Wmax, so that the side grips 7 are able to rest on the support members 26.

The height H1 of the support members 26 during a carrying operation of the snowmobile carrier 20 is greater than the height H2 of the side grips 7 of the snowmobile placed on packed snow.

The right and the left side frames 21 are interconnected by a connecting bar 27 which is curved in an arch. The height H3 of the connecting bar 27 is greater than the height H4 of the highest portion of the body excluding the steering bar 5. Therefore, the connecting bar 27 does not interfere with the upper portion of the body when loading the snowmobile on the snowmobile carrier 20.

The operation of the embodiment will be described hereinafter. When the snowmobile is inclined towards one side as shown in FIG. 3, the side grip 7 comes into contact with packed snow (the ground) first and supports the body so that the body cover 6 and the painted surfaces do not touch the packed snow (the ground) because the side grips 7 project from the body and defines the maximum width Wmax of the body. Thus, the side grips 7 serve also as side bumpers.

When carrying the snowmobile, the snowmobile carrier 20 is advanced from a position behind the snowmobile shown in FIG. 4. The snowmobile is received between the right and the left frame 21. Then, the side frames 21 are declined forwardly to lower the support members 26 below the side grips 7 and the snowmobile carrier 20 is further advanced to move the support members 26 under the side grips 7.

Subsequently, the support member 24 is turned to bring the hook 25 into engagement with the rear grip 8, and the handles 23 are pushed down to turn the snowmobile carrier 20 on the wheel 22. Consequently, the support members 26 are moved up and come into contact with the side grips 7 from below to lift up the snowmobile in a state shown in FIG. 5.

The snowmobile is supported stably at three points thereon by the support members 26 which are in engagement with the side grips 7, and the support member 24 which is in engagement with the rear grip 8.

Since the center of gravity G of the body is at a position near the side grips 7 and between the side grips 7 and the rear grip 8, the snowmobile can easily be lifted up. Since the ratio of the horizontal distance between the handles 23 and the center of the wheel 22 to the horizontal distance between the support members 26 and the center of the wheel 22 is large, the snowmobile can easily be leveraged upwardly.

Since the center of gravity is located at a position between the side grips and the rear grip, the snowmobile can easily be handled when supporting the snowmobile at three points on the right and the left side grip and the rear grip for carrying. Accordingly, the snowmobile does not need many individuals for carrying the snowmobile and can be carried only by one individual. The side grips 7 may be used as carrying grips.

Figure 6:
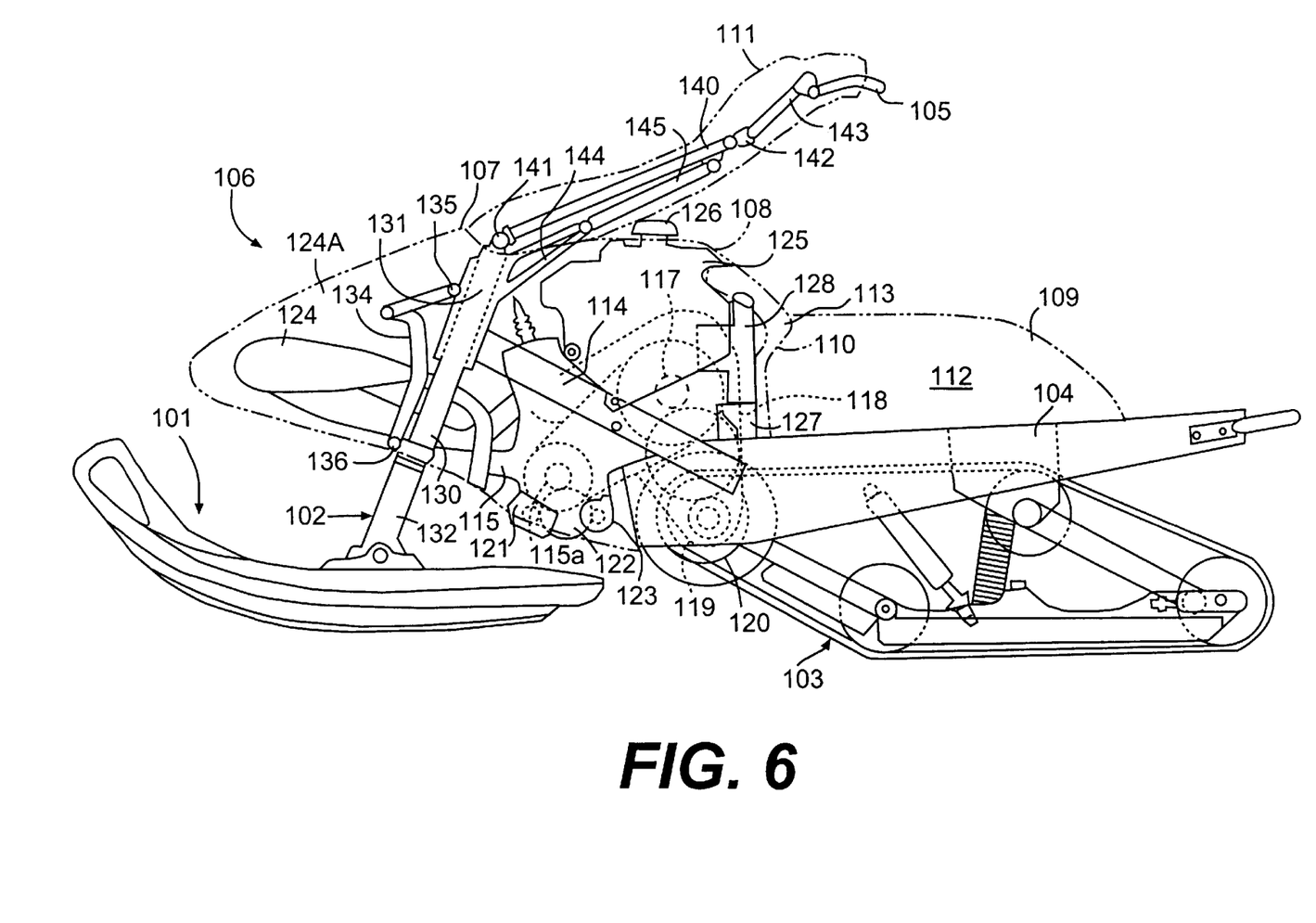
FIG. 6 is an enlarged side view of a snowmobile, in which a body cover is removed.
Figure 7:
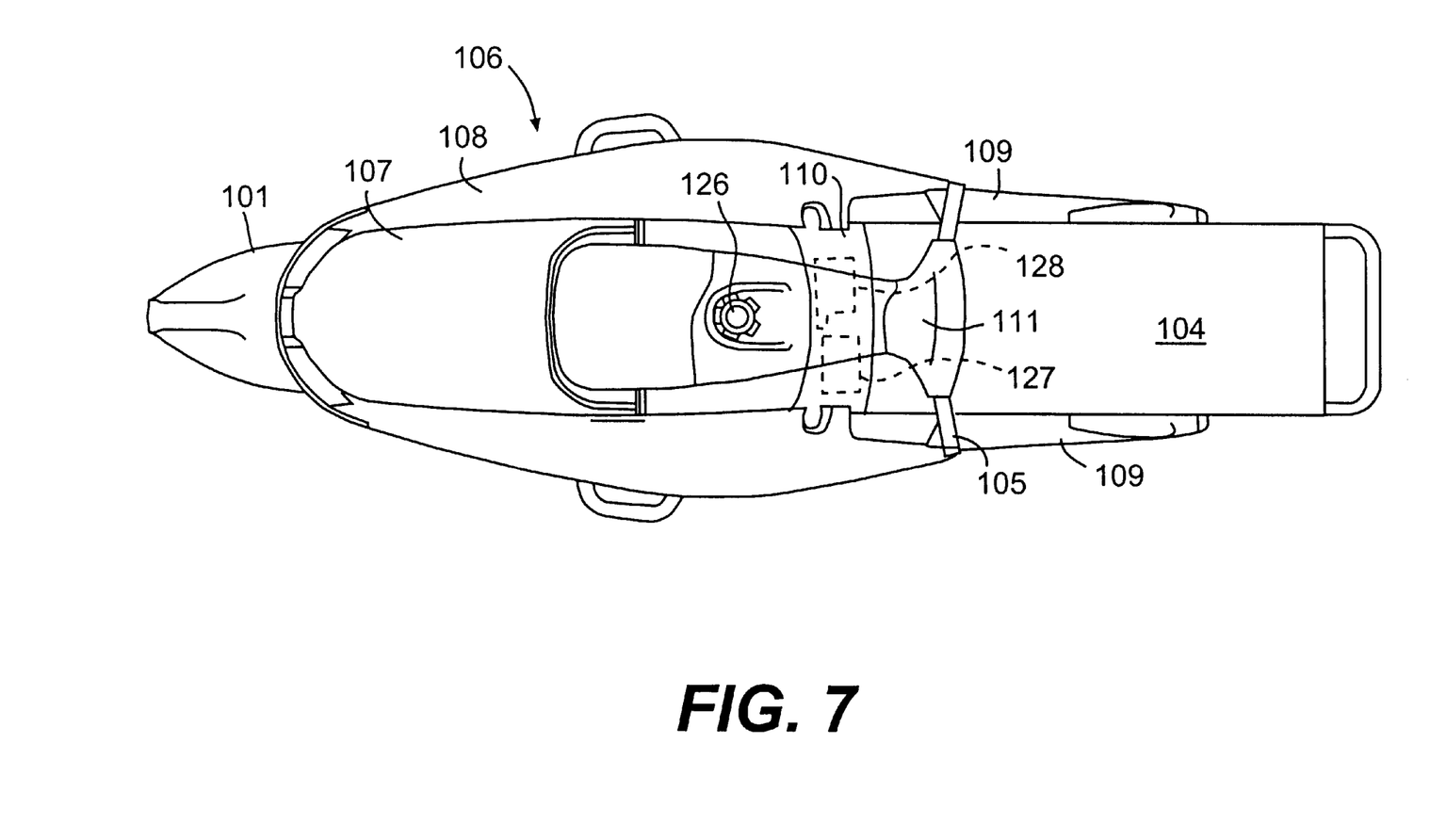
FIG. 7 is a plan view of a snowmobile.

Referring to FIGS. 6 and 7, a steering ski 101 is suspended from a front portion of a body by a front suspension 102, and a caterpillar unit 103 is suspended from a rear portion of the body. The caterpillar unit 103 is driven by an engine, which will be described later. A rider standing on a floor 104, extending over the caterpillar unit 103, operates a steering bar 105.

The front portion of the body is covered with a body cover 106 comprising a front cover 107 longitudinally extended so as to cover a central portion of the body, and a side cover 108 extending so as to cover the sides of the body.

Referring to FIG. 6, a rear portion 109 of the side cover 108 extends along the opposite sides of the floor 104. A lid 110 and a handle cover 111 are provided and are illustrated by a broken line.

As shown in FIG. 6, the body cover 106 divides a standing space 112 on the floor 104 and an engine compartment 113 in front of the standing space 112.

An engine 115 installed in the engine compartment 113 is supported on a pair of members of a main frame 114, longitudinally extending on the right and the left side of the body. The output power of the engine 115 is transmitted from a crankshaft 115a through a belt-drive variable-speed transmission 116 and a gear train including gears 117, 118 and 119 to a drive wheel 120 included in the caterpillar unit 103.

The engine 115 is provided with an oil pump 121, a balancer 122 and a water pump 123. An exhaust pipe 124 is disposed in a chamber 124a in front of the engine 115 so as to discharge the exhaust gas downwardly from the body cover 106.

The rear ends of the right and the left side members of the main frame 114 are welded to the right and the left side surface of a front portion of the floor 104 having a cross section resembling the inverted letter U.

A fuel tank 125 is supported above the engine 115 with a cap 126 covering the fuel supply opening of the fuel tank 125 projecting above from the side cover 108.

The side cover 108 extends longitudinally from a front portion of the body over the fuel tank 125 to a position behind the fuel tank 125. A maintenance opening is formed in a back wall of the side cover 108, and the maintenance opening is covered with a lid 110.

The lid 110 serves as a partition wall dividing the standing space 112 and the engine compartment 113. When the lid 110 is removed to open the maintenance opening, the standing space 112 communicates with the engine compartment 113. With the removal of the lid 110 a battery 127 and an oil tank 128 are accessible for maintenance work.

The battery 127 and the oil tank 128 are fixedly disposed on the front end portion of the floor 104 at positions on the side of the engine compartment 113 relative to the lid 110. A cap 129 for the oil tank 128 is disposed in a space defined by a curved rear portion of the lid 110.

The front suspension member 102 is of a known erect telescopic type and includes an inner tube 130 inserted in a head pipe 131. The front ends of the right and the left members of the main frame 114 are attached to the head pipe 131.

The inner tube 130 and an outer tube 132 are linked by an upper link 133 and a lower link 134. The upper link 133 is joined pivotally to the head pipe 131 by a pivot shaft 135. The lower link 134 is joined pivotally to the upper stay 136 of the outer tube 132.

The lower end of a steering shaft 140 is joined for back-and-forth swing motion to the upper end of the inner tube 130 by a joint 141. A handle post 143 is joined to the upper end of the steering shaft 140 by a universal joint 142, and the steering bar 105 is attached to the free end of the handle post 143.

A damper 145 extends between a portion of the steering shaft 140 near the universal joint 142. A stay 144 extends obliquely upwardly towards the rear from the upper end of the head pipe 131.

The steering shaft 140 is capable of being moved for back-and-forth swinging motion. The rider's riding position can be varied to control the body of the snowmobile by optionally moving the steering shaft 140 and the universal joint 142 back and forth and side to side.

The steering ski 101 can be turned to steer the snowmobile by turning the steering bar 105 about the axis of the handle post 143.

Figure 8:
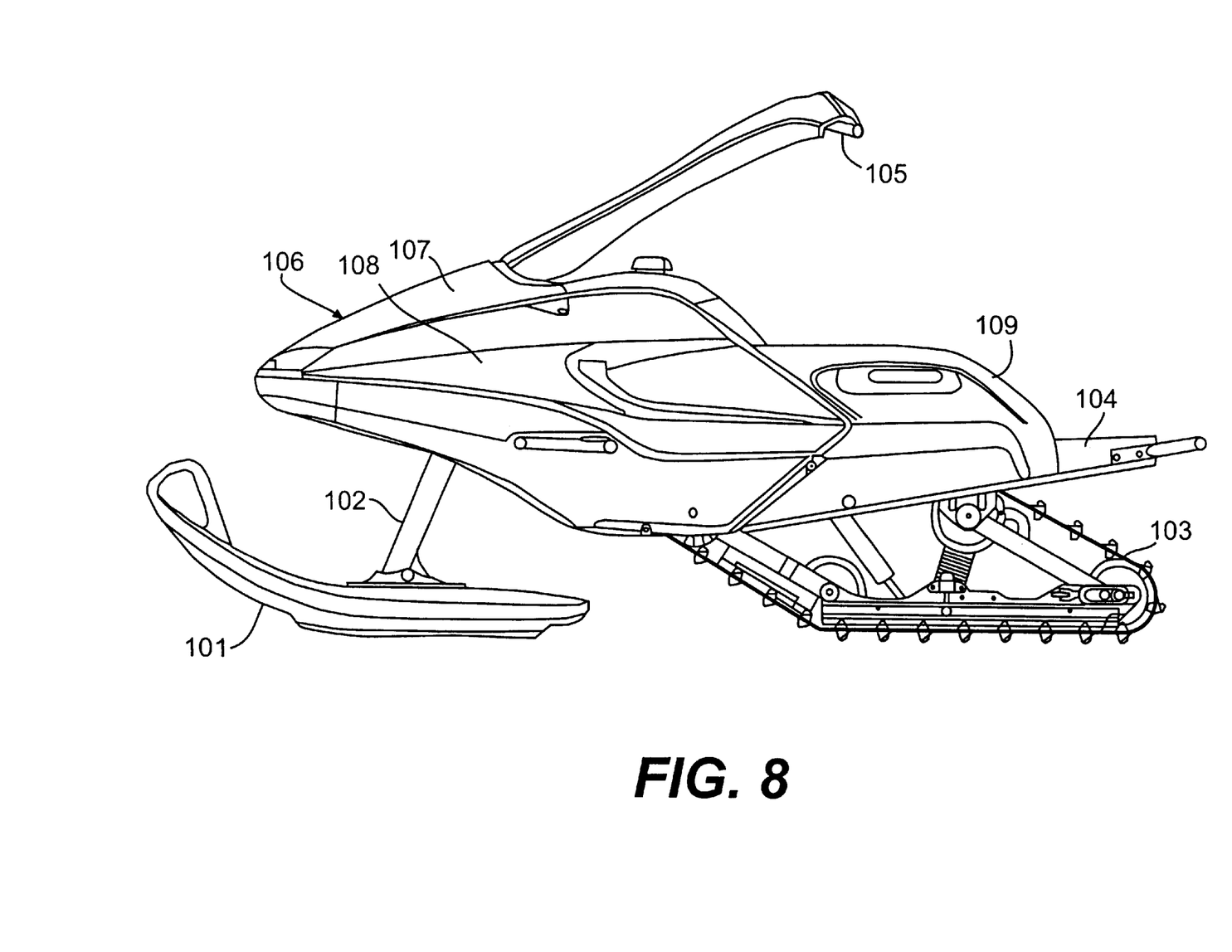
FIG. 8 is a side view of a snowmobile.

The operation of the second embodiment will be described with reference to FIGS. 6 and 8, since the lid 110 is attached to the body cover 106 so as to cover the maintenance opening formed in the back wall of the body cover 106, the rider standing on the floor 104 is able to inspect easily the oil tank 128, the battery 127 and such which are installed in the engine compartment 113.

Since the lid 110 is placed outside a region in which the handle post 143 swings, inspection work can be carried out regardless of the position of the steering bar 105 without requiring troublesome work for removing the body cover 106. Parts other than the foregoing parts are accessible through the maintenance opening opened by removing the lid 110.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A snowmobile assembly comprising:
   a body having a front portion, a right side surface, a left side surface and a rear portion;
   a steering ski suspended from said front portion of the body;
   an engine-driven caterpillar unit suspended from said rear portion of the body;
   side bumpers projecting outwardly from the right and the left side surfaces of the body and defining a maximum width of the body, each of said side bumpers forming grips for enabling said snowmobile to be held by an individual;
   a rear grip being mounted on said rear portion of the body; and
   a carrier, said carrier includes wheels operatively connected to side frames thereof, said side frames being of a predetermined distance from one another and forming a width therebetween greater than said maximum width, each of said side frames having a support member for engaging said side bumpers to permit the snowmobile to be elevated relative to a ground surface,
   wherein said snowmobile includes a steering bar and said carrier includes a connecting bar for connecting said side frames relative to each other, said connecting bar being disposed beneath said steering bar and above said side bumpers.

2. The snowmobile assembly according to claim 1, wherein the center of gravity of the snowmobile is located between the side bumpers and the rear grip.

3. The snowmobile assembly according to claim 1, wherein said side bumpers and said rear grip are U-shaped members to permit an individual to grasp said side bumpers and said rear grip for holding the same.

4. The snowmobile assembly according to claim 1, wherein, when said snowmobile is inclined to a predetermined degree, said side bumpers, projecting outwardly from said right and left side of said body, engage a ground surface.

5. The snowmobile assembly according to claim 1, wherein said carrier further includes a suspending member for securing to said rear grip of said snowmobile for maintaining said snowmobile at an elevated position.

6. The snowmobile assembly according to claim 1, and further including support members being secured to said side frames of said carrier for engaging said side bumpers.

7. The snowmobile assembly according to claim 6, wherein said carrier is adapted to be manually tilted for permitting said support members to be engaged with said side bumpers and thereafter manually rotated downwardly for permitting said snowmobile to be elevated relative to a ground surface.

8. The snowmobile assembly according to claim 1, wherein said side bumpers prevent said right and left side surfaces from being damaged.

9. The snowmobile assembly according to claim 1, wherein said side bumpers have lateral extending members connectively attached by a member essentially perpendicular therebetween.

10. A snowmobile assembly comprising:
 a body having a front portion, a right side surface, a left side surface and a rear portion, said body includes an engine compartment formed in front of a floor of said body, said floor being formed rearwardly from the engine compartment for forming a standing space for a rider on the floor;
 a steering ski including a steering shaft being suspended from the front portion of the body, said steering shaft includes an upper portion projecting upwardly from said steering ski;
 a power-driven caterpillar unit suspended from the rear portion of the body;
 a steering bar attached to a steering post supported for back-and-forth swinging motion on the upper portion of the steering shaft of the steering ski, said steering bar being operated by the rider standing on a floor extending over the caterpillar unit;
 a body cover for the covering said body, said body cover includes a lid for covering an opening formed on a rearward surface of the body cover to permit the engine compartment and the standing space to be in communication with each other; and
 a carrier, said carrier includes wheels operatively connected to side frames thereof, said side frames being of a predetermined distance from one another and forming a width therebetween greater than said maximum width, each of said side frames having a support member for engaging said side bumpers to permit the snowmobile to be elevated relative to a ground surface,
 wherein said carrier includes a connecting bar for connecting said side frames relative to each other, said connecting bar being disposed beneath said steering bar and above said side bumpers.

11. The snowmobile assembly according to claim 10, wherein removal of said lid exposes at least a battery and an oil tank disposed adjacent thereto.

12. The snowmobile assembly according to claim 10, and further including a right side bumper being positioned on said right side surface of said snowmobile and left side bumper being positioned on said left side surface of said snowmobile, said right and left side bumper having lateral extending members connectively attached by a member essentially perpendicular therebetween, and further including a rear grip mounted on the rear portion of said snowmobile.

13. The snowmobile assembly according to claim 12, wherein said right and left side bumpers and said rear grip are U-shaped members to permit an individual to grasp said side bumpers and said rear grip for holding the same.

14. The snowmobile assembly according to claim 10, wherein, when said snowmobile is inclined to a predetermined degree, one of said right and left side bumpers having lateral extending members connectively attached by a member essentially perpendicular therebetween, projecting outwardly from said right and left side of said body, engage a ground surface.

15. The snowmobile assembly according to claim 10, wherein said carrier further includes a suspending member for securing to said rear grip of said snowmobile for maintaining said snowmobile at an elevated position.

16. The snowmobile assembly according to claim 10, and further including support members being secured to said side frames of said carrier for engaging said right and left side bumpers.

17. The snowmobile assembly according to claim 16, wherein said carrier is adapted to be manually tilted for permitting said support members to be engaged with said right and left side bumpers and thereafter manually rotated downwardly for permitting said snowmobile to be elevated relative to a ground surface.

\* \* \* \* \*